United States Patent [19]

Wilder

[11] Patent Number: 5,028,851
[45] Date of Patent: Jul. 2, 1991

[54] VEHICLE STEERING SYSTEM

[75] Inventor: Anthony J. Wilder, Bristol, United Kingdom

[73] Assignee: TRW Cam Gears Limited, Clevedon, England

[21] Appl. No.: 531,840

[22] Filed: Jun. 1, 1990

[30] Foreign Application Priority Data

Aug. 8, 1989 [GB] United Kingdom ............... 8918098

[51] Int. Cl.⁵ ............................................. B62D 5/06
[52] U.S. Cl. ........................................ 318/2; 60/434; 180/6.2; 180/132
[58] Field of Search ..................... 318/2, 489; 180/6.2, 180/6.24, 6.26, 6.28, 6.3, 6.44, 79.1, 132, 133, 141, 142; 60/432, 434; 417/44, 45

[56] References Cited

U.S. PATENT DOCUMENTS

| | | | |
|---|---|---|---|
| 2,775,132 | 12/1956 | Orr et al. | 180/79.1 X |
| 3,558,239 | 1/1971 | Schiber | 180/133 X |
| 4,022,220 | 1/1977 | Wible | 180/141 |
| 4,476,677 | 10/1984 | Hanshaw | 180/133 |
| 4,523,494 | 6/1985 | Sparks et al. | 180/6.2 X |
| 4,535,678 | 8/1985 | Thomsen et al. | 180/132 X |

Primary Examiner—Bentsu Ro
Attorney, Agent, or Firm—Tarolli, Sundheim & Covell

[57] ABSTRACT

A vehicle steering system with power assistance means comprises an output component 4 displaceable relative to a housing 1 for that component and in response to a steering input for effecting a steering maneuver. The housing 1 is mounted for displacement relative to a frame part 9 of the vehicle. An hydraulic servo motor 13 is provided for assisting displacement of the output component 4 and reacting between the output component 4 and the vehicle frame part 9. An hydraulic pump 44 supplies working fluid to the servo motor 13 and a control valve 20 controls the supply of working fluid to the servo motor 13 in response to relative displacement between the housing 1 and the frame part 9 as a reaction to a steering maneuver and that response controls the servo motor 13 to assist the maneuver. In order to control operation of the pump 44, switch means 60 are provided, actuated by movement of the valve member 42 of the control valve 20, to energize the motor drive of the pump motor when power assistance is required.

8 Claims, 5 Drawing Sheets

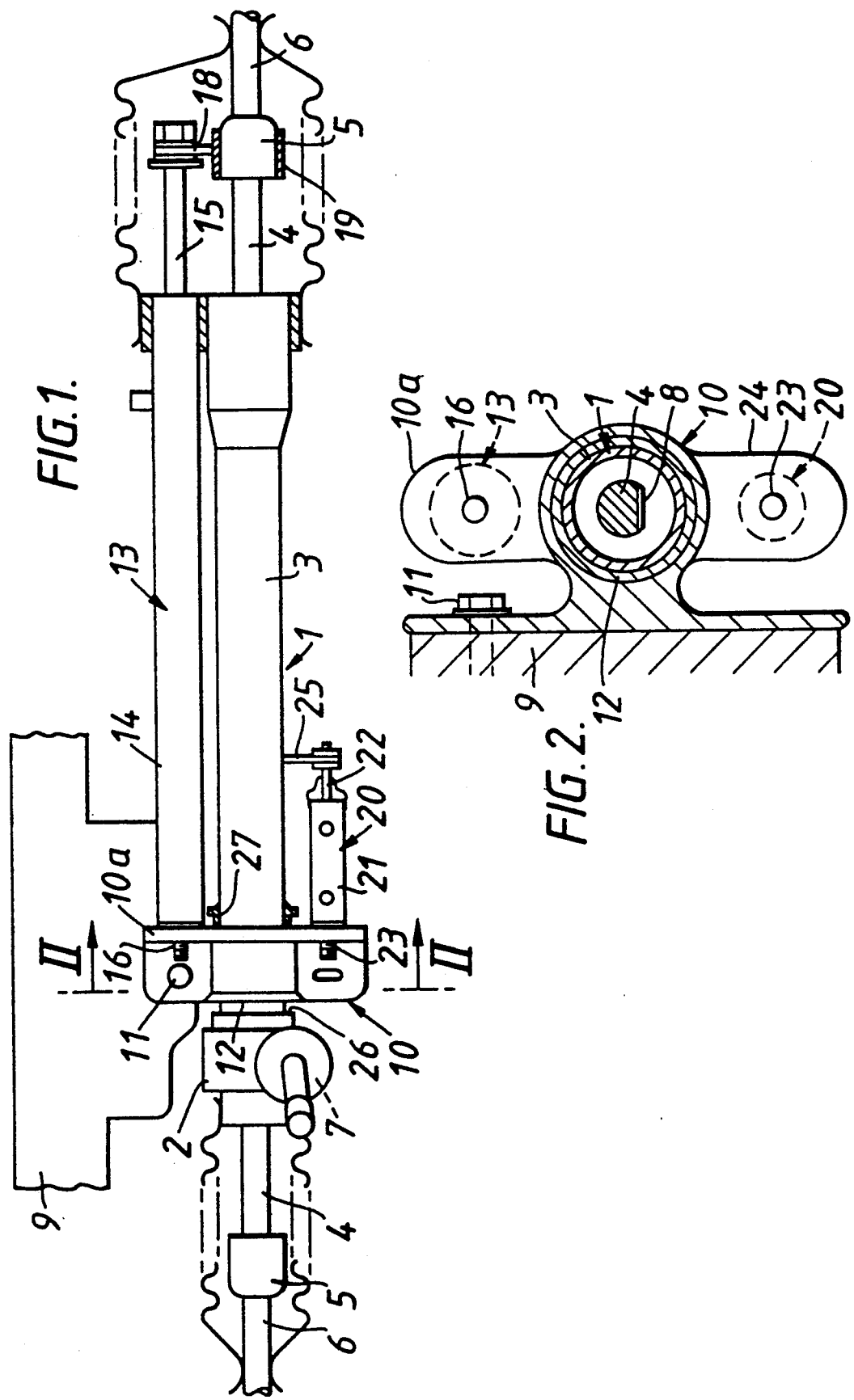

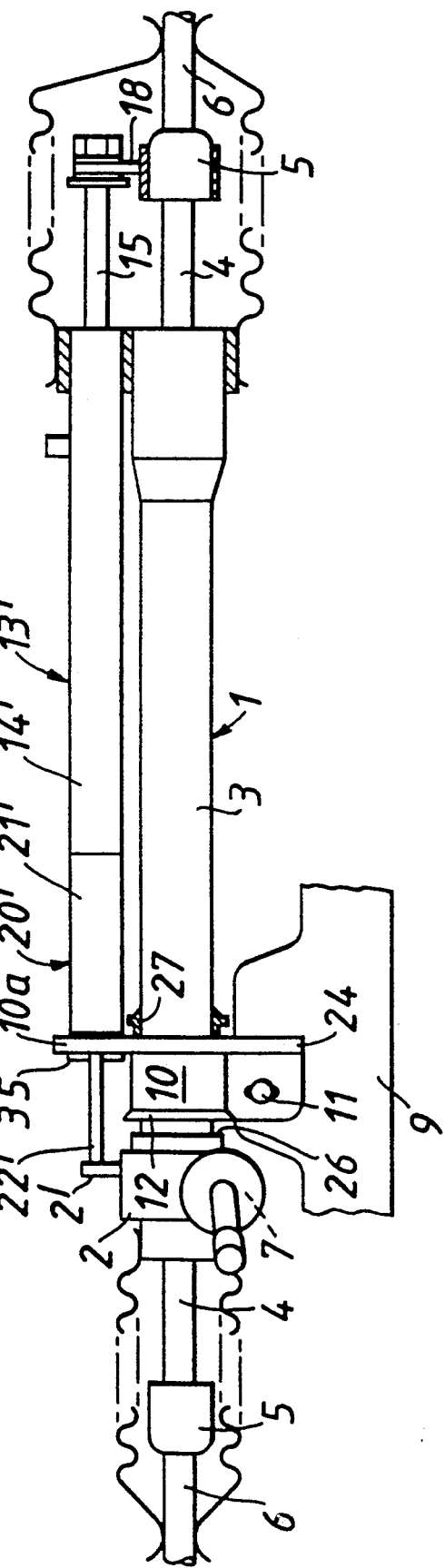

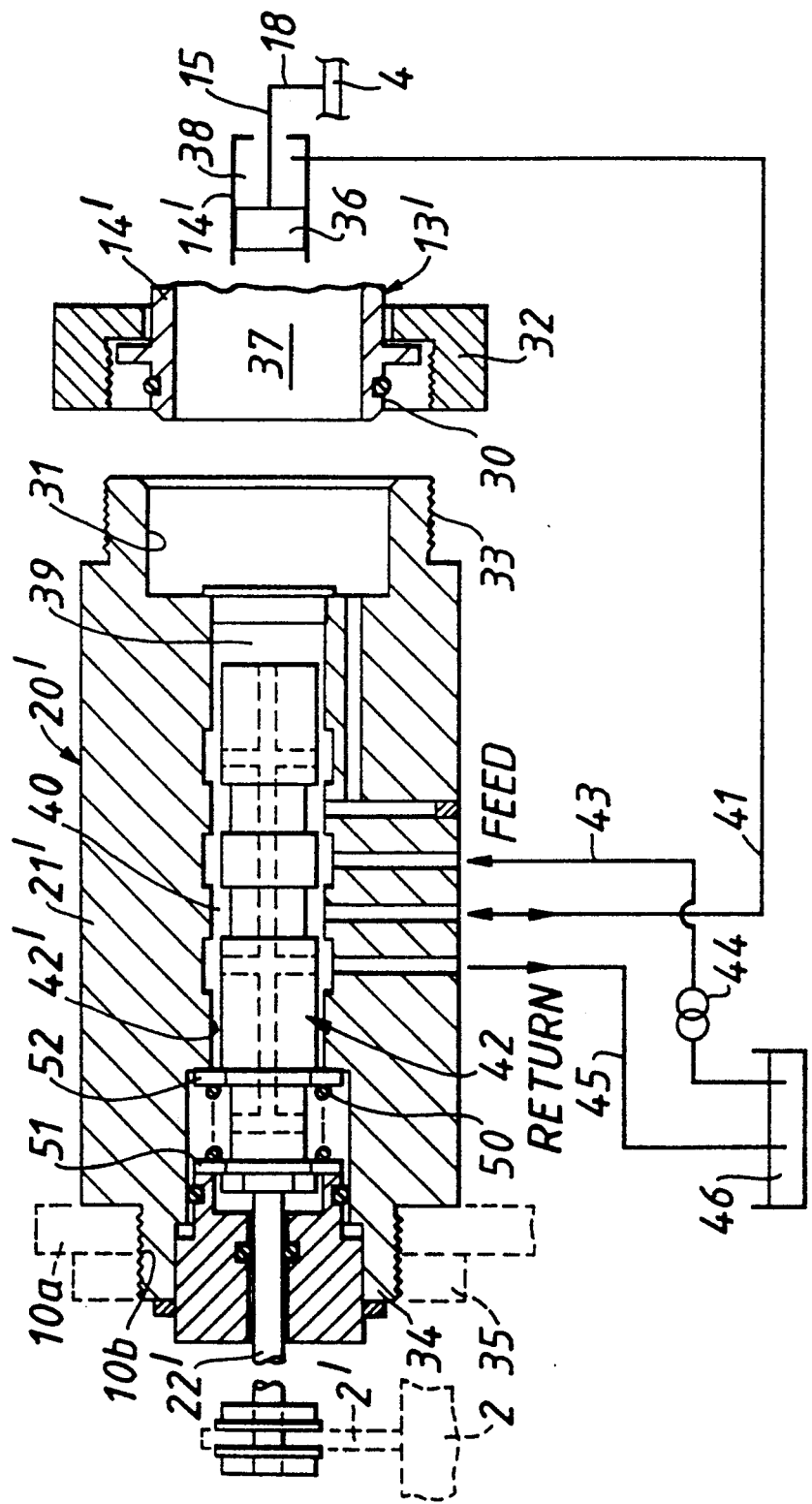

VEHICLE STEERING SYSTEM

TECHNICAL FIELD AND BACKGROUND ART

The present invention relates to a vehicle steering system and is particularly concerned with such systems in which power assistance for a steering manoeuvre is provided by an hydraulic servomotor (such as a double acting piston and cylinder device) working fluid for which is provided by an electrically driven pump and controlled by a valve which determines the supply of the working fluid to the servomotor in response to a steering input to assist the intended steering manoeuvre. Known steering systems of the kind aforementioned having electrically driven pumps are usually inefficient as providing a continual drain on the electrical energy available during use of the vehicle and it is an object of the present invention to provide a vehicle steering system in which wastage of electrical energy is alleviated.

Examples of power assisted steering systems which may utilise an electrically driven hydraulic pump for power assistance are to be found in our co-pending British patent application No. 8814358 (as this applies to hydraulic systems) and also in our British patent specifications Nos. 2,193,695 and 2,203,394.

STATEMENT OF INVENTION AND ADVANTAGES

According to the present invention there is provided a vehicle steering system comprising an hydraulic servomotor providing power assistance for a steering manoeuvre; an hydraulic pump driven by an electric motor for supplying working fluid; a control valve for controlling supply of working fluid to the servomotor in response to a steering input for a steering manoeuvre, and switch means which is closed in a neutral position to de-energise the pump motor and openable to energise the pump motor and which is responsive to a said steering input to be displaced from its neutral position to open and energise the pump motor for the supply of working fluid, and wherein said switch means comprises two components which are displaceable from the neutral position and relative to each other in response to a said steering input, a first contact on one component, a second contact on the second component and a bridging contact located between the first and second contacts, the bridging contact being movable relative to both said first and second contacts and biased in a direction towards engagement with both the first and second contacts, the arrangement being such that when the switch means is in its neutral position the bridging contact engages both the first and second contacts to close the switch means, when the first component moves in one direction relative to the second component from the neutral position engagement between the first contact and the bridging contact is broken to open the switch means, and when the first component moves in an opposite direction relative to the second component from the neutral position engagement between the second contact and the bridging contact is broken to open the switch means.

By the present invention the switch means will control energisation of the pump motor in response to a steering input torque for a steering manoeuvre so that working fluid is supplied as demanded for assisting the intended manoeuvre. Consequently for relatively long periods during which a vehicle may be in use without a steering manoeuvre being effected, the pump motor will remain deenergised and thereby alleviate wastage of electrical energy (and thereby power generally) for the vehicle. A particular advantage of the relatively simple and inexpensive structure of the switch means incorporated in the present invention is that it opens from its closed neutral position to cause energisation of the pump motor in response to a steering input torgue for a steering manoeuvre irrespective of the direction of the intended steering manoeuvre.

The relative displacement between the first and second components of the switch means may be achieved in a rotary sense, for example, between coaxially disposed components as in a rotary valve. Preferably however, the first and second components are substantially coaxial and exhibit displacement axially relative to each other from the neutral position in response to a steering input. The first component may comprise a spool or similar member which is received within and displaceable relative to a cylinder of the second component. Such a spool and cylinder arrangement conveniently comprises the control valve. Although the relatively displaceable first and second components preferably constitute or are coupled to the control valve it will be realised that these components can be otherwise formed and located, for example the components may be associated with a steering gear which forms part of the system or with a steering column through which the steering input torgue may be applied. In our co-pending application No. 88 14 358 the steering system comprises an output component displaceable relative to a housing for that component and in response to a steering input for effecting a steering manoeuvre. The housing is mounted for displacement relative to a frame part of the vehicle and the hydraulic servomotor for assisting displacement of the output component reacts between the output component and the vehicle frame part. In response to a steering input for a steering manoeuvre there is a relative displacement between the housing and the frame part which serves to adjust the control valve for controlling the supply of working fluid to the servomotor and such adjustment in the control valve can serve to determine displacement of the switch means from its neutral condition.

Where the first and second contacts are substantially coaxial and exhibit axial displacement relative to each other, it is preferred that the first contact is substantially annular on the first component, the second contact is substantially annular on the second component and that the bridging contact is substantially annular, said annuli being coaxial and the bridging contact having an inner diameter less than the outer diameter of the first contact and an outer diameter greater than the inner diameter of the second contact. With this structure of the switch means the bridging contact may be carried by the first component and seated on an insulating tube surrounding the first component to be axially displaceable on the first component into and out of engagement with the first contact.

A further preference is that the system has an electrical relay which controls energisation of the pump motor and which is normally closed to energise the pump motor. The switch means controls energisation of the relay and is arranged so that when the switch means is closed in its neutral position the relay is energised to open and thereby de-energise the pump motor, and when the switch means is open from its neutral position the relay is de-energised to close and thereby energise the pump motor for the supply of working fluid. With such a relay incorporated in the electrical circuit of the system it will be appreciated that if the circuit part controlling energisation of the relay fails, the relay contacts will automatically revert to their closed condition to energise the pump motor and thereby ensure that working fluid will be available for power assistance.

DRAWINGS

Embodiments of a vehicle steering system constructed in accordance with the present invention will now be described, by way of example only, with reference to the accompanying illustrative drawings in which.

FIG. 1 is a side elevation diagrammatically illustrating one form of power assisted steering system to which the invention can be applied;

FIG. 2 is a section taken on the line II—II of FIG. 1;

FIG. 3 is a view similar to FIG. 1 and diagrammatically illustrates a second form of power assisted steering to which the invention can be applied;

FIG. 4 shows a longitudinal section through a spool valve which controls the servo motor in the arrangement of FIG. 3;

DETAILED DESCRIPTION OF THE DRAWINGS

Figure 5:
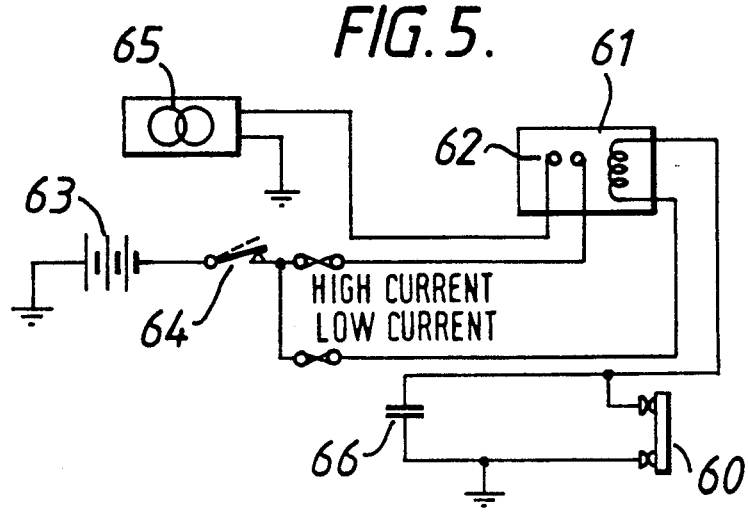
FIG. 5 is a circuit diagram of a circuit for controlling operation of an hydraulic pump in a power assisted steering system in accordance with the invention.

The steering gear to which the present invention can be applied has been described and illustrated in our GB copending Application No. 88 14 358.1. Basically, referring to FIGS. 1 and 2 the steering gear comprises a tubular housing 1 constituted by a pinion housing part 2 and a longitudinally extending rack bar housing part 3. A rack bar 4 extends longitudinally through the housing 1 and has its ends connected through ball joints 5 to tie rods 6. The tie rods 6 are coupled into the steering gear linkage of a vehicle in known manner. Rotatably mounted in the housing part 2 is a pinion 7, the teeth of which engage with a rack 8 on the rack bar so that rotation of the pinion in response to a steering input torque displaces the rack bar 4 longitudinally relative to the housing 1 to effect a steering manoeuvre.

The tubular housing 1 is received within, and longitudinally displaceable relative to, a bracket 10 and the latter is rigidly attached, for example by bolts 11 to the vehicle frame 9. The housing 1 is resiliently mounted in the bracket 10 by an elastomeric annular seating 12 sandwiched between the housing and bracket.

The gear shown in FIG. 1 has a servo motor in the form of a double acting hydraulic ram 13 comprising a ram housing 14 within which a piston having a piston rod 15 is displaceable in response to fluid pressure differentials applied to opposite sides of the piston. The ram housing 14 is bolted at its end 16 remote from the piston rod 15 to a flange 10a of the mounting bracket 10 while the end of the piston rod 15 which extends from the ram housing is coupled at 18 to a casing 19 of the ball joint 5 so that the piston rod and rack bar will exhibit substantially parallel and unified longitudinal displacement.

The ram 13 is controlled by a spool valve 20 comprising a spool housing 21 within which is axially displaceable a spool having an axially extending spool rod 22. The spool housing 21 is bolted at its end 23 to a flange 24 of the bracket 10 while the spool rod 22 is coupled at 25 for parallel and unified longitudinal displacement with the housing 1.

The spool valve 20 and ram 13 are hydraulically interconnected and incorporated in an hydraulic control system which provides the ram with open centre/open return characteristics as are well known in the art of power assisted steering systems. For convenience therefore the full hydraulic system and the interconnection of the ram and spool valve within that system have been omitted from FIGS. 1 and 2 (although these will be discussed generally hereafter with reference to FIG. 4).

When the rack bar 4 in FIG. 1 is displaced in response to a steering input torque through the pinion 7 to turn steerable road wheels of the vehicle, the resistance to turning movement of the road wheels results in a reaction to displace the housing 1 in a longitudinal direction opposite to that in which the rack bar is displaced. Displacement of the housing 1 is permitted by the resilient seating 12 so that the housing 1 moves longitudinally relative to the fixed mounting bracket 10. Since the spool of the valve 20 is connected through the spool rod 22 and coupling 25 for unified longitudinal displacement with the housing 1 while the spool housing 21 is fixed relative to the bracket 10, the displacement of the housing 1 results in adjustment of the spool valve 20 from its neutral condition. The latter adjustment controls the flow of hydraulic fluid to opposed chambers in the ram 13 to actuate the ram and extend or contact the piston rod 15 to provide power assistance for the displacement of the rack bar 4.

It will be appreciated that if the resistance to turning of the steerable road wheels increases it will be necessary to apply a greater input torque to rotate the pinion 7. This will result in a greater reaction being applied to the housing 1 to cause the housing and the spool of the spool valve to be displaced to a greater extent from the neutral condition—as a consequence a greater fluid pressure differential will be developed in the ram to assist the steering manoeuvre.

The spool value 20 will usually be sensitive to extremely small longitudinal displacements of the housing 1—in practice it is expected that full control of the hydraulic system will be provided by axial displacement of the spool in its housing 21 of approximately + or − 1 millimeter from a control neutral condition of the spool. Stops indicated at 26 and 27 are provided on the housing 1 for abutment with the bracket 10 to restrict the longitudinal displacement which is permitted for the housing 1 relative to the bracket 10.

In the modification shown in FIGS. 3 and 4 the spool valve 20 and ram 13 of FIG. 1 have effectively been combined as indicated at 20' and 13' respectively to form a single compact unit which extends longitudinally from the flange 10a of the bracket 10.

The structure of the unit 13'/20' is better seen from FIG. 4 where the tubular spool housing shown at 21' is coupled in end-to-end and co-axial relationship with the tubular ram housing shown at 14'. The coupling between the housing 14' and 21' is conveniently effected by a spigot end 30 of the ram housing being received in a socketed end 31 of the spool housing and retained by engagement of an internally screw threaded collar 32 on the ram housing with a complementary external thread 33 of the spool housing. The spool housing 21' has its end 34 remote from the ram externally screw threaded and received in a complementary hole 10b through the bracket flange 10a and is retained rigidly attached to the flange by a nut 35.

In FIG. 4 the general arrangement of the hydraulic system and of the ram 13' are indicated diagrammatically only where it will be seen that the ram piston 36 forms in the housing 14' opposed chambers 37 and 38 of which the chamber 37 is in constant communication with a spool end chamber 39 through the coupling 30/31 while the chamber 38 is in constant communication with an annular spool transfer chamber 40 by way of a conduit 41. The spool of the valve 20' (shown diagrammatically at 42) is axially displaceable in a spool cylinder 42' and has spool rod 22' which extends from the spool housing through the bracket 10a to be coupled to a flange 2' on the pinion housing part 2. The spool valve 20' has a pressure/feed conduit 43 from a pump 44 and a return/exhaust conduit 45 to a reservoir 46. The spool 42 is arranged together with its control ports and lands and also those of the spool cylinder 42' to provide open centre/open return characteristics for the ram chambers 37 and 38. Open centre/open return spool valves are well known and conventional for power assisted steering gears whereby when the spool is in a neutral condition both ram chambers 37 and 38 and the output from the pump 44 communicate with the reservoir 46. If the spool 42 is displaced rightwardly in FIG. 4 relative to its cylinder and from the neutral condition, the ram chamber 38 progressively opens communication with the pump output 43 while the latter closes communication with the return 45 and ram chamber 37 progressively opens its communication with the return and closes communication with the pressure output—the ram piston 36 is consequently displaced leftwardly in the figure to assist displacement of the rack bar 4. If the spool 42 is displaced leftwardly from its neutral condition in FIG. 4, the ram chamber 38 is progressively closed to communication with the pump output 43' and opens communication with the return line 45 while the ram chamber 37 is progressively closed to communication with the return line 45 and opens to communication with the output from the pump 44—the ram piston 36 is consequently displaced rightwardly in FIG. 4 to assist displacement of the rack bar. Similarly to conventional open centre type spool valves, the spool 42 is biassed axially to its neutral condition by spring 50 (which acts between freely floating plates 51, 52 and against shoulders of the spool and of the spool housing in known manner).

From the hydraulic control system as above described with reference to FIG. 4, it will be appreciated that when the pinion 7 is rotated in response to a steering input torque to displace the rack bar 4 in one sense of direction there is a reaction on the housing 3 which displaces the housing longitudinally in the opposite sense of direction. The spool 42 is thereby displaced axially in said opposite sense of direction (through the coupling of the flange 2' and the spool rod 22') so adjusting the spool valve 20' from its neutral condition and pressuring the piston ram 36 to be driven in the first sense of direction to provide power assistance to the required displacement of the rack bar 4. When the steering input torque to the pinion ceases the housing 1 will be displaced longitudinally relative to the bracket 10 in the first sense of direction to revert to its original (control) position by the effect of its resilient mounting within the bracket 10 (which may bias the housing longitudinally to its control position) and by the reaction from the piston rod 15 providing power assistance in the first sense of direction as a minimal over-run which will cause the spool valve to revert to its neutral condition.

In this type of arrangement, it is usually desired only to have the hydraulic pump running when power assistance is required. To this end means are required to detect the application of a steering input torgue to the steering wheel, which means can then be used to cause energisation of the pump motor. A circuit for this purpose is shown in FIG. 5. A normally closed switch 60 is provided on the spool valve 20 and this is connected to a normally closed relay 61. The contacts 62 of this relay 61 are in a circuit containing the pump motor 65 so that when the contacts 62 are closed the battery 63 is connected through the ignition switch 64 to the pump motor 65.

Thus in operation of the circuit with the switches 60 and 64 closed (and the relay thereby energised to open contacts 62), when the spool 42 of the spool valve 20 is moved from its central neutral position, the switch 60 is opened. This de-energises the relay 61, closing the contacts 62 and causing the pump motor 65 to be actuated. At the end of a steering manoeuvre, the spool 42 of the spool valve 20 will return to its central neutral position, thus closing the switch 60 and energising the relay 61 to cut off the pump motor 65. If required, a capacitor 66 may be provided across the contacts of the switch 60. It will be appreciated that the circuit above described can be used with either of the embodiments described in relation to FIGS. 1 to 4.

Figure 6:
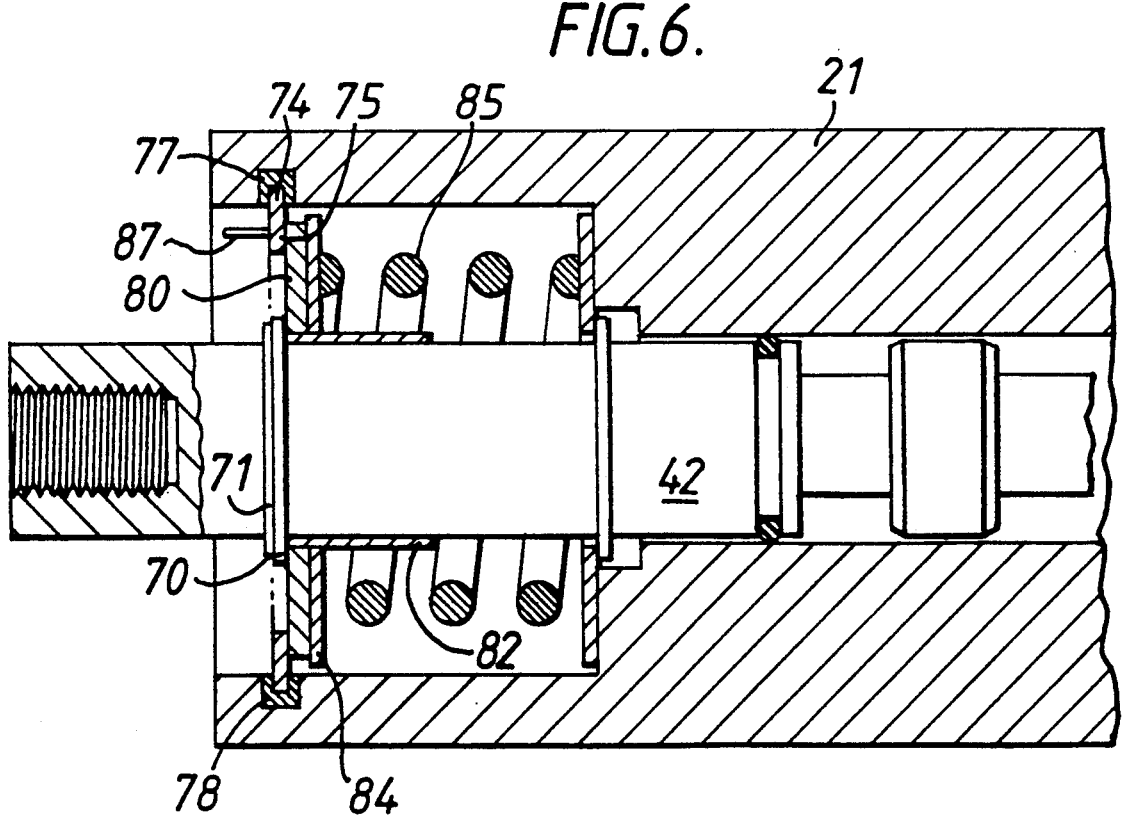
FIG. 6 is a part longitudinal section through a spool valve, such as that shown in FIG. 4 showing the switching arrangement of the circuit shown in FIG. 5.

The construction of the switch 60 is shown in FIG. 6 which shows one end of a spool valve such as that shown in FIG. 4. The switch 60 is situated around the spool 42 of the spool valve and comprises an annular collar 70 of conducting material retained in electrical contact on the spool 42 and located by a circlip 71. A second contact 74 is located on the spool valve housing and comprises and annulus 75 of conducting material which is mounted in an annular recess 77 by means of a suitable insulating epoxy resin 78. A bridging contact 80, in the form of an annular contact member having an inner diameter which is smaller than the outer diameter of the collar 70 and of greater outer diameter than the inner diameter of the second contact 74. This bridging contact is mounted on a plastics tube 82, suitably shrunk onto the spool 42, and relative to which it is movable axially. The bridging contact 80 is backed by a fibre washer 84 against which a biasing spring 85 acts to bias the bridging contact to the left as seen in FIG. 6. Electrical connection to the switch 60 is provided by a lead 87 connected to the second contact 74 and earthing of the body 21 of the spool valve and providing an electrical contact, not shown, between the spool 42 and the spool body 21 by any suitable means.

In the position shown in FIG. 6, the spool valve is in its central neutral position and the switch is closed by electrical contact of the bridging contact 80 with both the first and second contacts 70 and 74, thus rendering the hydraulic pump inoperative.

Figure 7:
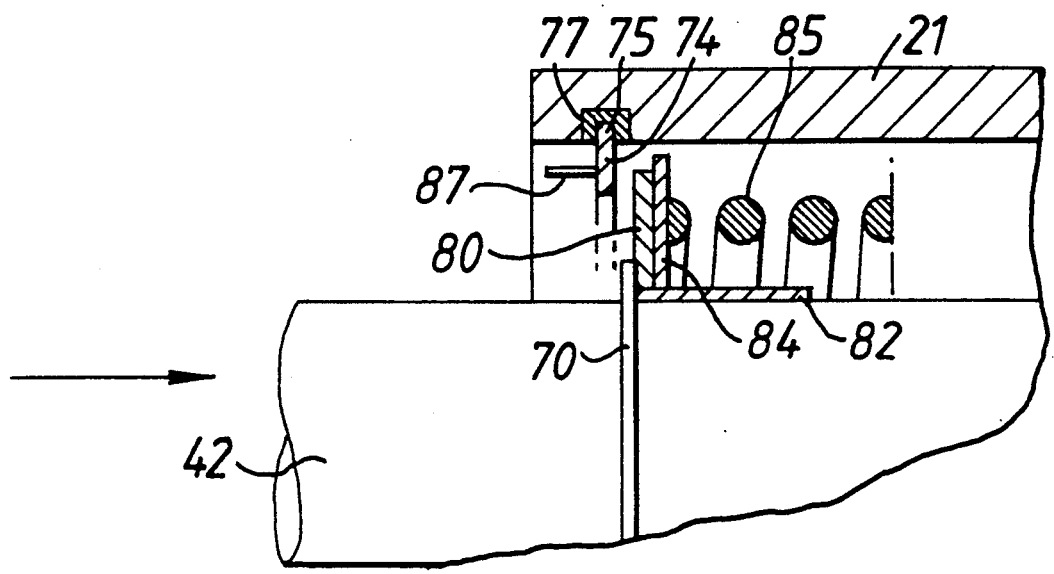
FIG. 7 shows, in longitudinal section, a part of the spool valve of FIG. 6 in a first operative position.

FIG. 7 shows what happens when the spool 42 of the spool valve moves to the right as a result of movement of the steering wheel. In this case the collar 70 moves to the right taking with it the bridging contact 80 against the action of the spring 85 thus breaking the contact between the bridging contact 80 and the second contact 74. This will de-energise the relay 61 and start the pump motor.

Figure 8:
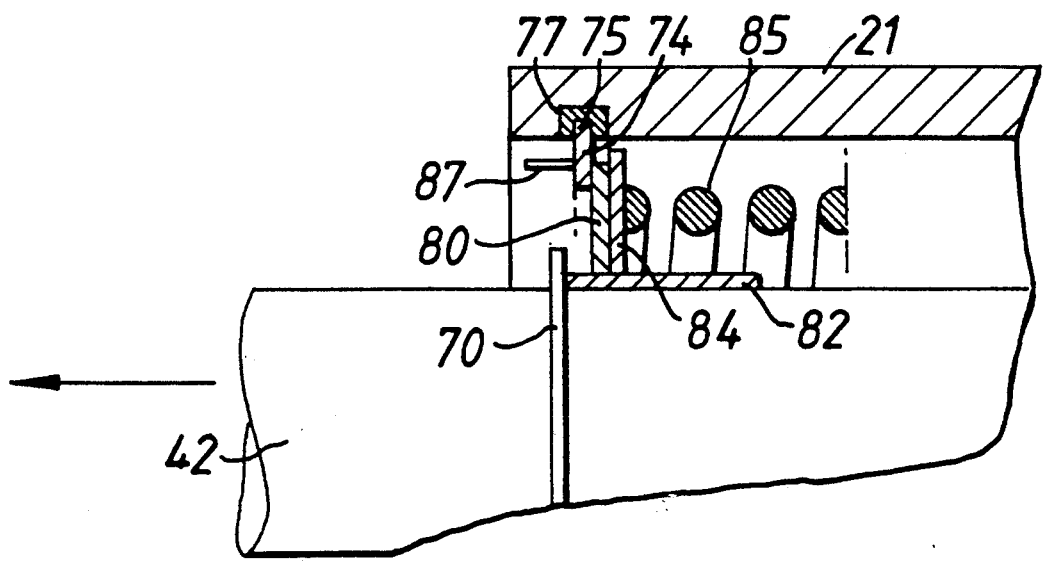
FIG. 8 is a view similar to FIG. 7 but showing the arrangement in a second operative position.

If on the other hand, the spool 42 moves to the left as shown in FIG. 8, the collar 70 and insulating tube 82 will also move leftwards. The bridging contact 80 will be maintained in engagement with the second contact 74 under the action of the spring 85. However, the contact 80 cannot follow the collar 70 and is insulated from the spool 42 by the plastics tube 82 so that once again the switch 60 is opened, de-energising the relay 61 and energising the pump motor.

It will be appreciated that while a particular form of normally closed switch 60 has been described, various modifications to this type of switch may be made without departing from the scope of the invention. For example, the positioning of the second contact 74 may be made adjustable by mounting it on a threaded member which could be screwed into the end of the spool valve body 21. In this way an adjustment of the relative positions of the contacts may be achieved so as to prevent any lost motion in the operation. If "switch bounce" is found to be a problem, a relay with a time delay can be used which remains closed for between, for example, five to ten seconds so that if the switch 60 closes momentarily power assistance will not be lost. If after the end of the delay period the switch 60 is still open, a new delay period is initiated but if the switch 60 has in the meantime closed and remained closed the pump motor will be de-energised.

I claim:

1. A vehicle steering system comprising an hydraulic servomotor providing power assistance for a steering manoeuvre; an hydraulic pump driven by an electric motor for supplying working fluid; a control valve for controlling the supply of working fluid to the servomotor in response to a steering input for the steering manoeuvre, and switch means which is closed in a neutral position to de-energise the pump motor and openable to energise the pump motor and which is responsive to said steering input to be displaced from its neutral position to open and energise the pump motor for the supply of working fluid, and wherein said switch means comprises two components which are displaceable from the neutral position and relative to each other in response to said steering input, a first contact on one component, a second contact on the second component and a bridging contact located between the first and second contacts, the bridging contact being movable relative to both said first and second contacts and biased in a direction towards engagement with both the first and second contacts, the arrangement being such that when the switch means is in its neutral position the bridging contact engages both the first and second contacts to close the switch means, when the first component moves in one direction relative to the second component from the neutral position, engagement between the first contact and the bridging contact is broken to open the switch means, and when the first component moves in an opposite direction relative to the second component from the neutral position, engagement between the second contact and the bridging contact is broken to open the switch means.

2. A system as claimed in claim 1 in which the first and second contacts are substantially co-axial and exhibit the displacement axially relative to each other from the neutral position in response to the steering input.

3. A system as claimed in claim 1 in which the first component comprises a spool and the second component comprises a cylinder within which the spool is displaceable.

4. A system as claimed in claim 3 in which the spool and its cylinder comprises said control valve.

5. A system as claimed in claim 2 in which the first contact is substantially annular on the first component, the second contact is substantially annular on the second component and the bridging contact is substantially annular, said annuli being coaxial and the bridging contact having an inner diameter less than the outer diameter of the first contact and an outer diameter greater than the inner diameter of the second contact.

6. A system as claimed in claim 5 in which the bridging contact is carried by the first component and is seated on an insulating tube surrounding the first component to be axially displaceable on the first component into and out of engagement with the first contact.

7. A system as claimed in claim 1 and comprising an electrical relay controlling energisation of the pump motor and which is normally closed to energise the pump motor and wherein said switch means controls energisation of the relay and is arranged so that when the switch means is closed in its neutral position, the relay is energised to open and thereby de-energise the pump motor, and when the switch means is open from its neutral position, the relay is de-energised to close and thereby energise the pump motor for the supply of working fluid.

8. A system as claimed in claim 7 in which the relay has a time delay whereby it remains closed to energise the pump motor for a predetermined period following energisation of the relay.

* * * * *